United States Patent
Varikat

(10) Patent No.: US 7,965,687 B2
(45) Date of Patent: Jun. 21, 2011

(54) METHOD AND SYSTEM FOR MULTIPLE-INPUT-MULTIPLE-OUTPUT (MIMO) COMMUNICATION IN A WIRELESS NETWORK

(75) Inventor: Anubala Varikat, Bangalore (IN)

(73) Assignee: Sasken Communications Technologies, Bangalore (IN)

( * ) Notice: Subject to any disclaimer, the term of this patent is extended or adjusted under 35 U.S.C. 154(b) by 1368 days.

(21) Appl. No.: 11/473,825

(22) Filed: Jun. 23, 2006

(65) Prior Publication Data

US 2007/0140208 A1   Jun. 21, 2007

(30) Foreign Application Priority Data

Dec. 15, 2005   (IN) .............................. 1843/CHE/2005

(51) Int. Cl.
*H04W 4/00*   (2009.01)
(52) U.S. Cl. ........................................ 370/334; 370/345
(58) Field of Classification Search .......... 370/200–253, 370/272–427, 431–546
See application file for complete search history.

(56) References Cited

U.S. PATENT DOCUMENTS

| | | | |
|---|---|---|---|
| 6,690,920 B2* | 2/2004 | Saarinen et al. | 455/67.11 |
| 7,184,776 B2* | 2/2007 | Fauconnier | 455/456.1 |
| 2003/0091022 A1* | 5/2003 | Blanz et al. | 370/350 |
| 2004/0114618 A1* | 6/2004 | Tong et al. | 370/431 |
| 2004/0131025 A1* | 7/2004 | Dohler et al. | 370/328 |
| 2005/0250506 A1* | 11/2005 | Beale et al. | 455/452.1 |
| 2006/0034164 A1* | 2/2006 | Ozluturk | 370/208 |
| 2006/0280262 A1* | 12/2006 | Malladi | 375/299 |

FOREIGN PATENT DOCUMENTS

EP   1383292   *   1/2004

* cited by examiner

*Primary Examiner* — Ricky Ngo
*Assistant Examiner* — Iqbal Zaidi
(74) *Attorney, Agent, or Firm* — Rahman LLC

(57) ABSTRACT

A method and a system for Multiple-Input-Multiple-Output (MIMO) communication in a wireless network are provided. According to the method, streams of the data of a user-equipment are communicated to a group of user-equipments that act as antennas for the user-equipment. The communication between the various user-equipments is through an Interlink. The data of the user-equipment is communicated with base stations by the user-equipment and the group of user-equipments in a single slot.

12 Claims, 7 Drawing Sheets

| | Slot of First user-equipment | Slot of Second user-equipment | Slot of Third user-equipment | Slot of Fifth user-equipment | Slot of Sixth user-equipment |
|---|---|---|---|---|---|
| Data handled by First user-equipment | First Stream of data of First user-equipment | | | | |
| Data handled by Second user-equipment | Second Stream of data of First user-equipment | First Stream of data of Second user-equipment | Second Stream of data of Third user-equipment | Second Stream of data of Fifth user-equipment | Second Stream of data of Sixth user-equipment |
| Data handled by Third user-equipment | Third Stream of data of First user-equipment | Second Stream of data of Second user-equipment | First Stream of data of Third user-equipment | | |
| Data handled by Fifth user-equipment | | | | First Stream of data of Fifth user-equipment | |
| Data handled by Sixth user-equipment | | | | | First Stream of data of Sixth user-equipment |

FIG. 7

METHOD AND SYSTEM FOR MULTIPLE-INPUT-MULTIPLE-OUTPUT (MIMO) COMMUNICATION IN A WIRELESS NETWORK

REFERENCE TO RELATED APPLICATIONS

This application claims the priority of Indian patent application 1843/CHE/2005, which was filed with the Indian Patent Office on Dec. 15, 2005.

BACKGROUND OF THE INVENTION

The invention generally relates to wireless networks. More specifically, the invention relates to multiple-input-multiple-output (MIMO) communication in wireless networks.

A MIMO wireless communication system comprises multiple antennas at the transmitter and the receiver. The use of multiple antennas increases the transmission capacity of the system as compared to a single-input-single-output (SISO) system. Thereby, increasing the number of users as well as the amount of data that can be sent by each user.

The antennas work best in a multi-path environment such that the streams, in which the data is transmitted and received, are uncorrelated. Closely spaced antennas in user-equipment lead to increased correlation between the data streams that are communicated by them. Due to the severe space constraints in user-equipment, it is not possible to accommodate a large number of sufficiently spaced antennas that are uncorrelated with each other.

This problem of inter-antenna correlations can be handled by various conventional methods. The paper titled 'Multi-user Space-Time Block Coded MIMO System with Unitary Downlink Precoding' by Runhua Chen, Jeffrey G. Andrews, and Robert W. Heath, Jr, describes one such method. The paper was published in Proceedings of IEEE International Conference on Communications, volume 5, pages. 2689-2693, in June 2004. This method suggests the use of a downlink precoder, to eliminate co-channel interference. The precoder eliminates co-channel interference at the base station itself so that single-antenna user-equipments can be used. However, the method operates well only when the transmitter at the base station has the complete channel state information.

Another conventional method tries to resolve the problem of inter-antenna correlation by assigning the different user-equipments present in the vicinity to a group. The data of the user-equipments is selectively beam-formed to the group by the base station. According to one such method, beamforming weight vectors are calculated. These vectors are multiplied to the signal so that the interference between the streams, of data can be avoided. However, the method operates satisfactorily only when channel state information is available at the base station. Moreover, as the streams transmitted by different antennas are correlated, beamforming cannot achieve the full capacity offered by MIMO communications.

Another conventional method is disclosed in the U.S. patent application Ser. No. 20040114618 titled 'Virtual MIMO Communication System' assigned to 'Nortel Networks Limited'. The method uses single antenna user-equipments for achieving MIMO communication. According to the method, the user-equipments are assigned to a group by the base stations. The user-equipments inter-transmit their data. The data of two or more user-equipments is cross-coded and combined into a single block. This block is then sent to the base station. Thereafter, the base station decodes the block to get the data of each user-equipment. However, the method is useful only when the data of two or more user-equipments is to be sent to the base station. Moreover, it can be used to obtain only as many antennas for communication as the number of antennas available with the users in the vicinity that are communicating during that period.

In view of the above discussion, there is a need for a MIMO communication method with low inter-antenna correlation that can function with the data of one or more user-equipments. Further, there is a need for a MIMO communication method in which the number of antennas transmitting or receiving is greater than the number of users in the same vicinity, communicating at a certain period, in one time, frequency, code or any other similar slot.

SUMMARY

An object of the invention is to improve the capacity of MIMO systems by reducing inter-antenna correlation between the channels of different pairs of the base station and the user-equipment antennas. Another object of the invention is to provide a MIMO system that can function with the data of one or more user-equipments. Still another object of the invention is to provide a MIMO system in which the number of antennas transmitting or receiving is greater than the number of users communicating at a certain period, in a slot that can be a time, frequency, code or any other similar slot.

Embodiments of the invention provide a method and a system for MIMO communication that can achieve the aforementioned objectives. According to various embodiments of the invention, one or more user-equipments operate as antennas to a first user-equipment for communicating with one or more multi-antenna base stations. The one or more user-equipments, operating as antennas for the first user-equipment, are referred to as a first set of user-equipments.

During uplink communication, the data of the first user-equipment is split and processed into several streams, based on the number of user-equipments in the first set. A first stream is transmitted by the first user-equipment to the base stations in a slot assigned for uplink communication of the first user-equipment. The remaining streams are transmitted, one each to the user-equipments in the first set on an Interlink, which facilitates communication between the various user-equipments. These remaining streams are then transmitted by the user-equipments in the first set to the base stations in the same slot as that used for the transmission of the first stream.

During downlink communication, the base station splits and processes the data of the first user-equipment into several streams based on the number of base station antennas that are available for transmission of the data. The streams of data are transmitted from the base station antennas in a slot that is assigned for downlink communication of the first user-equipment. The first user-equipment and the user-equipments in the first set receive different versions of the data. The user-equipments in the first set then transmit the received data to the first user-equipment on the Interlink. The first user-equipment receives and combines this data with the data it received from the base station antennas. In addition, a second set of user-equipments is also defined for the first user-equipment. The second set comprises those user-equipments for which the first user-equipment operates as an antenna.

According to various embodiments of the invention, sets of user-equipments are formed on the basis of the quality of the channel between them, which is obtained by measurements performed on pilot signals broadcast by the user-equipments.

According to various embodiments of the invention, the number of user-equipments in the first set during uplink communication may be different from the number of user-equipments in the first set during downlink communication. Similarly, the number of user-equipments in the second set during uplink communication may be different from the number of user-equipments in the second set during downlink communication.

According to various embodiments of the invention, the base stations or the user-equipments control the formation of the first set and the second set.

According to various embodiments of the invention, the first set and the second set are dynamic, i.e., the user-equipments in the first set as well as in the second set keep changing.

BRIEF DESCRIPTION OF THE DRAWINGS

The embodiments of the invention will hereinafter be described in conjunction with the appended drawings. These drawings have been provided to illustrate and not to limit the invention, wherein, like designations denote like elements, and in which:

FIG. 7 illustrates the uplink communication of data by user-equipments using Time Division Multiple Access (TDMA), in accordance with an embodiment of the invention.

DESCRIPTION OF THE EMBODIMENTS

Figure 1:
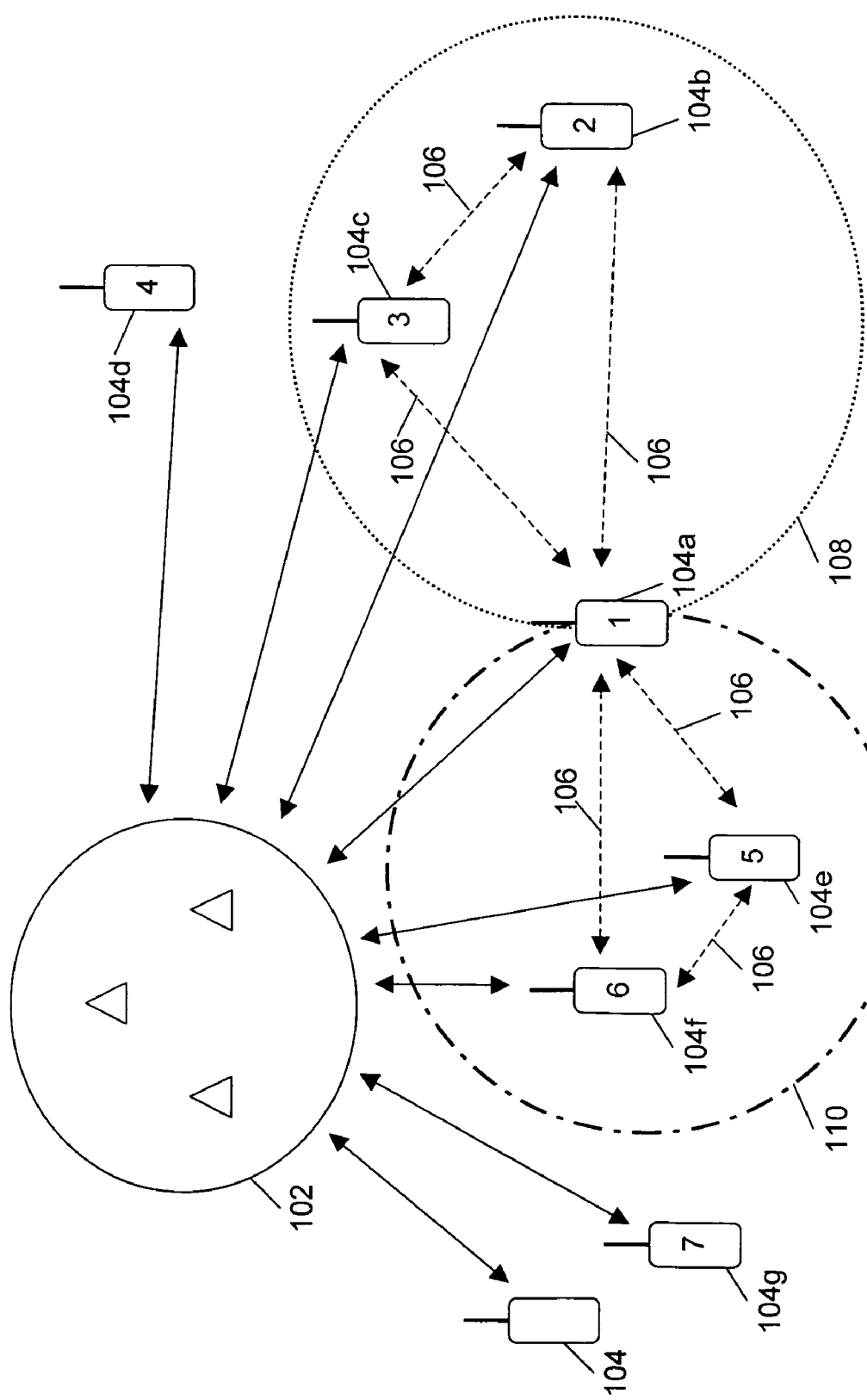
FIG. 1 illustrates a system for communication of data in a wireless network, in accordance with an embodiment of the invention.

FIG. 1 illustrates a system for the communication of data in a wireless network, in accordance with an embodiment of the invention. The wireless network comprises base stations 102 and user-equipments 104. Base stations 102 may have multiple antennas for communicating data with user-equipments 104. In various embodiments of the invention, each user-equipment 104 may have one or more antennas. Examples of user-equipments 104 include cellular phones, transportable phones, portable phones, and personal digital assistants (PDAs), among others.

User-equipments 104 are capable of communicating with base stations 102. In various embodiments of the invention, base stations 102 and user-equipments 104 can communicate using Time Division Multiple Access (TDMA), Code Division Multiple Access (CDMA) and Frequency Division Multiple Access (FDMA), among others. According to an embodiment of the invention, one or more of user-equipments 104 communicate with each other on an Interlink 106. Interlink 106 may be implemented by using a radio technology, such as Ultra Wide Band (UWB) communication, which transfers data at a high speed using low power over short distances. In an embodiment of the invention, Interlink 106 uses the same radio technology as the one used for communication between one or more of user-equipments 104 and base stations 102. In another embodiment of the invention, a different radio technology may be used for communication on Interlink 106.

According to an embodiment of the invention, a first user-equipment 104a communicates with a first set 108 of user-equipments 104 on Interlink 106. First set 108 includes one or more of user-equipments 104 that can operate as antennas for first user-equipment 104a, excluding first user-equipment 104a. For example, first set 108 may include a second user-equipment 104b and a third user-equipment 104c. First set 108 is capable of communicating data of first user-equipment 104a with base stations 102.

In an embodiment of the invention, first user-equipment 104a may act as an antenna for itself, and may communicate with base stations 102 using its own antennas and the antennas of user-equipments 104 in first set 108. In another embodiment of the invention, first user-equipment 104a may not act as an antenna for itself, and may communicate with base stations 102 using only the antennas of user-equipments 104 in first set 108.

According to an embodiment of the invention, first user-equipment 104a communicates with a second set 110 of user-equipments 104 on Interlink 106. Second set 110 includes user-equipments 104 for which first user-equipment 104a operates as an antenna, excluding first user-equipment 104a. For example, second set 110 may include fifth user-equipment 104e and sixth user-equipment 104f. First user-equipment 104a is capable of communicating the data of second set 110 with base stations 102. In an embodiment of the invention, one or more of user-equipments 104 may be common to first set 108 and second set 110.

Figure 2:
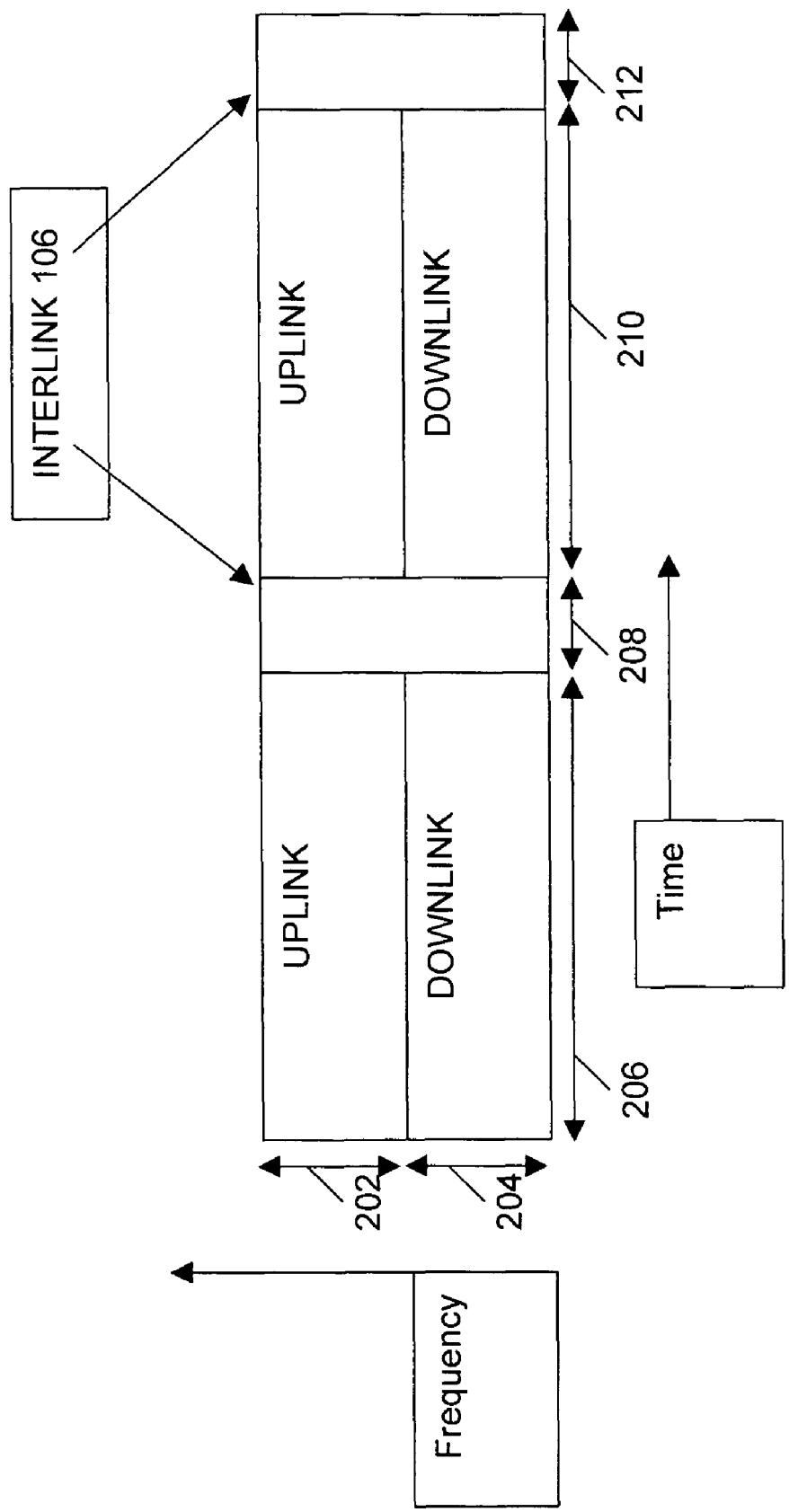
FIG. 2 illustrates the multiplexing of data for communication with base stations and on an Interlink, in accordance with an embodiment of the invention.

FIG. 2 illustrates the multiplexing of data for communication with base stations 102 and on Interlink 106, in accordance with an embodiment of the invention. The uplink and downlink communication are frequency-multiplexed. Therefore, the signals for the uplink communication and the downlink communication are modulated on different frequencies, for example, frequencies 202 and 204. In this manner, the uplink and downlink communication are made independent of each other. In addition, the communication on Interlink 106 is time-multiplexed with the communication with base stations 102. Therefore, the communication on interlink 106 occurs in different time-slots to those used in for communication with base stations 102. Time-slots 206 and 210 are used for communication with base stations 102 and time-slots 208 and 212 are used for communication on Interlink 106.

Figure 3:
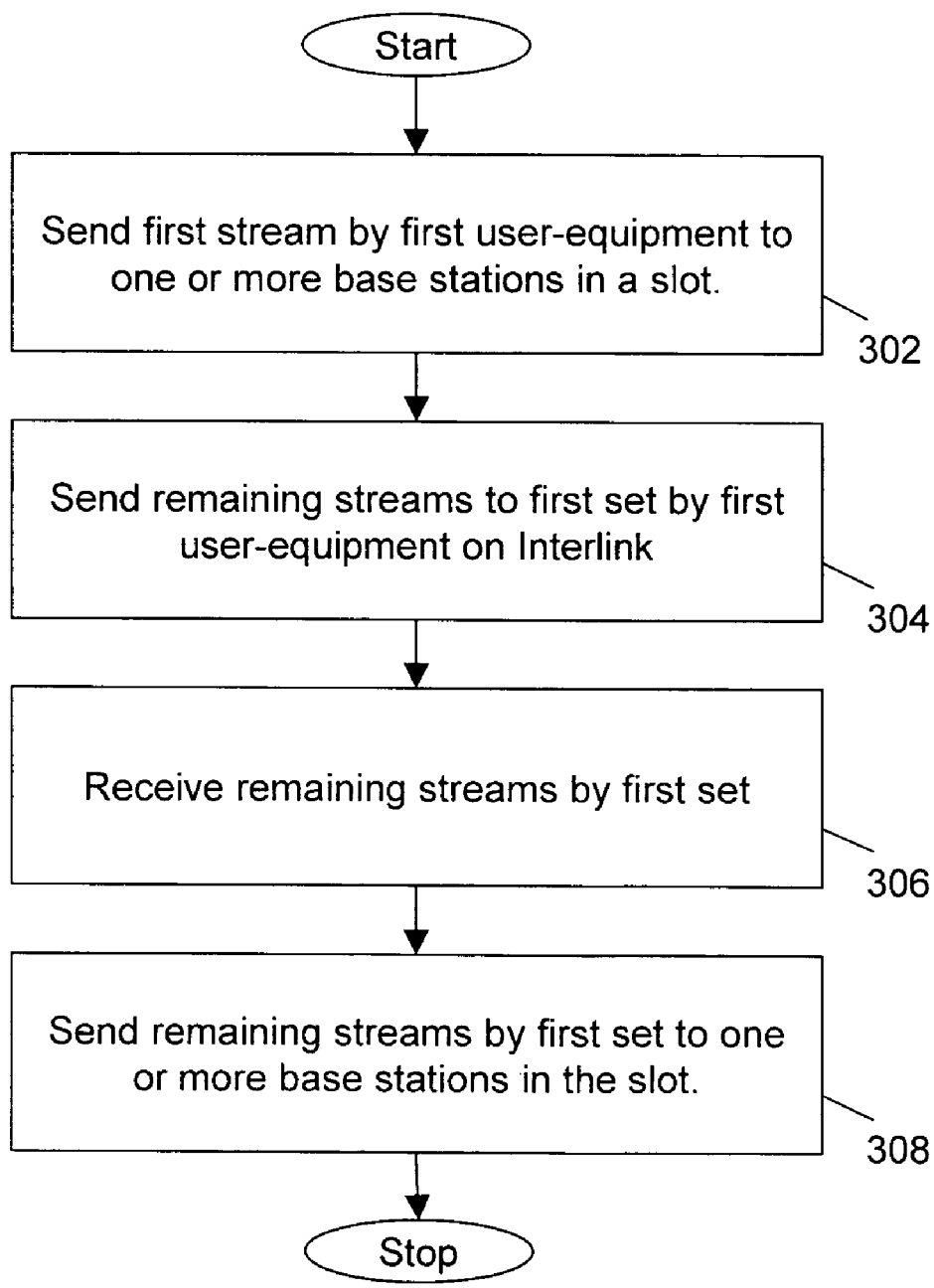
FIG. 3 is a flowchart depicting a method for uplink communication of data in a wireless network, in accordance with an embodiment of the invention.

FIG. 3 is a flowchart depicting a method for uplink communication of data in a wireless network, in accordance with an embodiment of the invention. The data of first user-equipment 104a is split and processed into one or more streams, based on the number of user-equipments in first set 108. At step 302, first user-equipment 104a transmits a first stream from the one or more streams to base stations 102 in a slot. The slot is assigned for the uplink communication of first user-equipment 104a. At step 304, first user-equipment 104a transmits the remaining streams of the one or more streams to user-equipments 104 in first set 108. First user-equipment 104a transmits one stream each to user-equipments 104 in first set 108. At step 306, user-equipments 104 in first set 108 receive these streams of the data. At step 308, user-equipments 104 in first set 108 transmit these streams to base stations 102 in the same slot that is used for transmitting the first stream to base stations 102. For example, if first set 108 comprises second user-equipment 104b and third user-equipment 104c, the data is split and processed into three streams. These three streams are transmitted to base stations 102 by first user-equipment 104a, second user-equipment 104b and third user-equipment 104c, respectively in the same slot.

Figure 4:
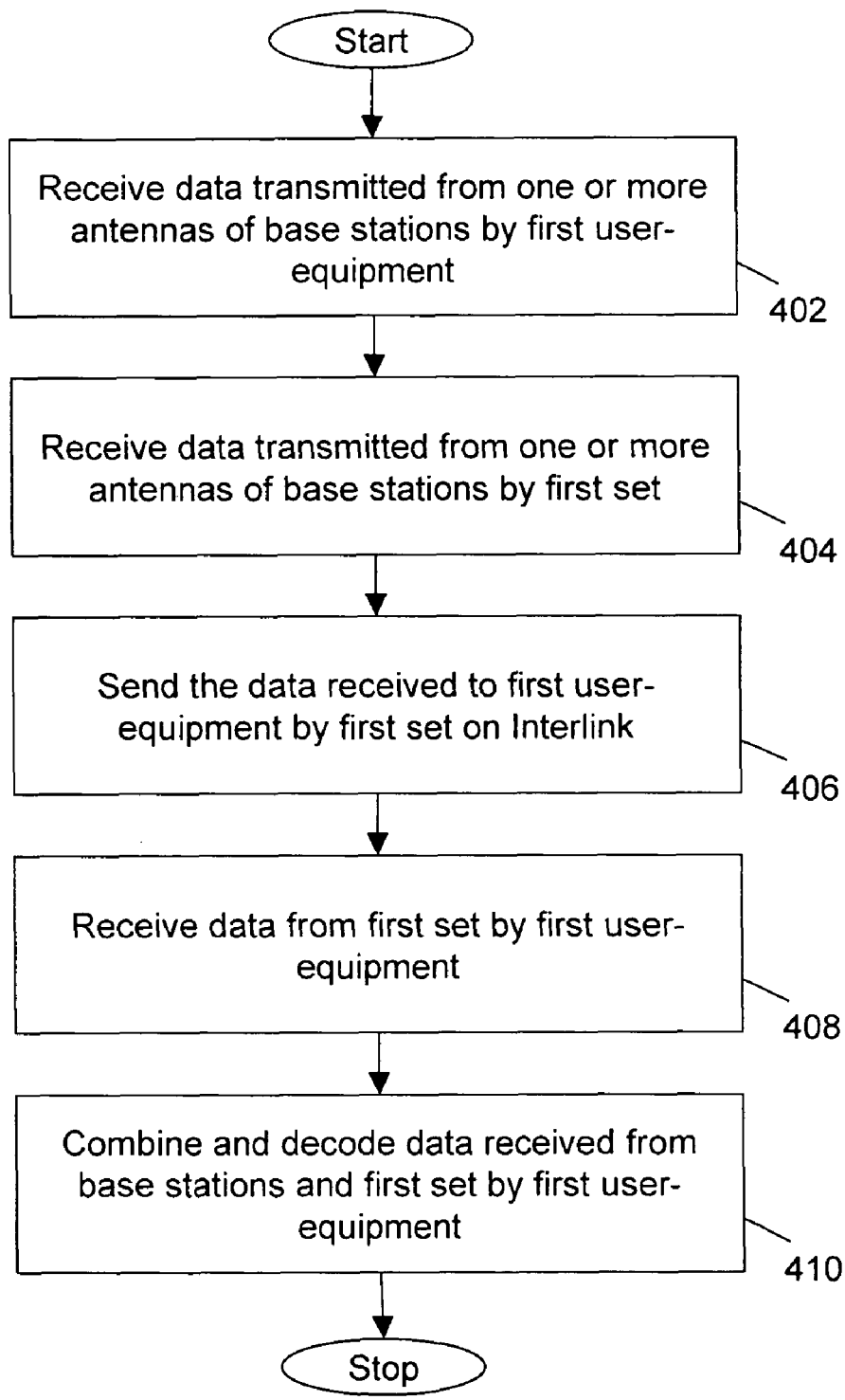
FIG. 4 is a flowchart depicting a method for downlink communication of data in a wireless network, in accordance with an embodiment of the invention.

FIG. 4 is a flowchart depicting a method for downlink communication of data in a wireless network, in accordance with an embodiment of the invention. Base stations 102 split and process the data of first user-equipment 104a into one or more streams, based on the number of antennas of base stations 102 used for downlink communication. Base stations 102 transmit one stream each from each antenna, in a single slot that is assigned for downlink communication of first user-equipment 104a. At step 402, base stations 102 transmit the data of first user-equipment 104a. The one or more streams constitute the data of first user-equipment 104a. At step 404, first user-equipment 104a receives the data transmitted by base stations 102. At step 406, user-equipments 104 in first set 108 receive the data transmitted by base stations 102. At step 408, first set 108 transmits the received data to first user-equipment 104a on interlink 106. At step 410, first user-equipment 104a combines the data received from base stations 102 at step 402 and the data received from first set 109 at step 408. After combining the data, first user-equipment 104a decodes the combined data.

In an embodiment of the invention, the number of user-equipments 104 in first set 108 during uplink communication may be different from the number of user-equipments 104 in first set 108 during downlink communication. Similarly, the number of user-equipments 104 in second set 110 during uplink communication may be different from the number of user-equipments 104 in second set 110 during downlink communication. In an embodiment of the invention, base stations 102 may define the slot in which first user-equipment 104a is going to communicate on Interlink 106. In another embodiment of the invention, user-equipments 104 may define the slots under local control, i.e., user-equipments 104 define the slots without the intervention from base stations 102. In this case, first user-equipment 104a looks for a vacant slot on Interlink 106. In an embodiment, a vacant slot is one in which the energy is below a threshold. In another embodiment, a vacant slot is one that has no control signals. When first user-equipment 104a finds a vacant slot, first user-equipment 104a schedules to transmit its data in that slot. In an embodiment, first user-equipment 104a may associate a control signal to the slot so that other user-equipments 104 are informed that the slot is not vacant. In another embodiment, user-equipments 104 periodically signal for the slots that are in use.

First set 108 and second set 110 are formed before first user-equipment 104a starts communicating data to user-equipments 104. To define first set 108 and second set 110, a first maximum number and a second maximum number are defined, for each of the uplink and the downlink communications. The first maximum number is the maximum number of user-equipments 104 that can be present in first set 108. In other words, the first maximum number is the maximum number of user-equipments 104 that can operate as antennas for first user-equipment 104a. The second maximum number is the maximum number of user-equipments 104 that can be present in second set 110. In other words, the second maximum number is the maximum number of user-equipments 104 for which first user-equipment 104a can operate as an antenna. In an embodiment of the invention, the first maximum number depends on the second maximum number. In other words, the number of user-equipments 104 that will operate as antennas to first user-equipment 104a depends on the number of user-equipments 104 for which first user-equipment 104a can operate as an antenna. In an embodiment, first user-equipment 104a can choose the second maximum number, and accordingly, the first maximum number is defined, subject to certain conditions. The first maximum number and the second maximum number cannot exceed a certain number fixed by the capability of first user-equipment 104a. Also, the first maximum number for uplink communication cannot exceed a certain number fixed by the capability of the base station 102 and the MIMO scheme being used. In various embodiments of the invention, the MIMO scheme being used may be BLAST (Bell Labs Layered Space-Time Architecture) or STTD (Space-Time Transmit Diversity), among others.

In an embodiment of the invention, first maximum number depends upon the number of antennas and the processing capability of base station 102. Before commencing communication, the number of user-equipments 104 in first set 108 is communicated to base station 102, and base station 102 communicates the maximum number of antennas it can use for receiving, to first user-equipment 104a. In many MIMO communication schemes, the number of receive-antennas needs to be greater than or equal to the number of transmit-antennas at the other end of the communication link. In uplink communication, base station 102 receives with at least as many antennas as the total number of antennas being used for transmission by first user-equipment 104a. Therefore, based on the number of antennas used by base station 102 for receiving data, the maximum number of antennas for transmitting the data of first user-equipment 104a is decided. This forms the basis for deciding the first maximum number in uplink communication. Similarly, in downlink communication, the base station 102 transmits with fewer antennas than the number of user-equipments 104 in the first set for the downlink.

After the first maximum number and the second maximum number are defined, base stations 102 ascertain user-equipments 104 that are placed in the same vicinity. This may be achieved by determining the location of user-equipments 104 by using direction and time-of-arrival information, or by using information on inter-user-equipment channel strengths that is communicated to base stations 102 by user-equipments 104. Then, base stations 102 send signals to one or more user-equipments 104 to form first set 108 and second set 110 for first user-equipment 104a. In an embodiment, base stations 102 may initiate a reconfiguration of one or more user-equipments 104 to operate as antennas for first user-equipment 104a. Alternatively, user-equipments 104 may initiate such a reconfiguration.

Figure 5:
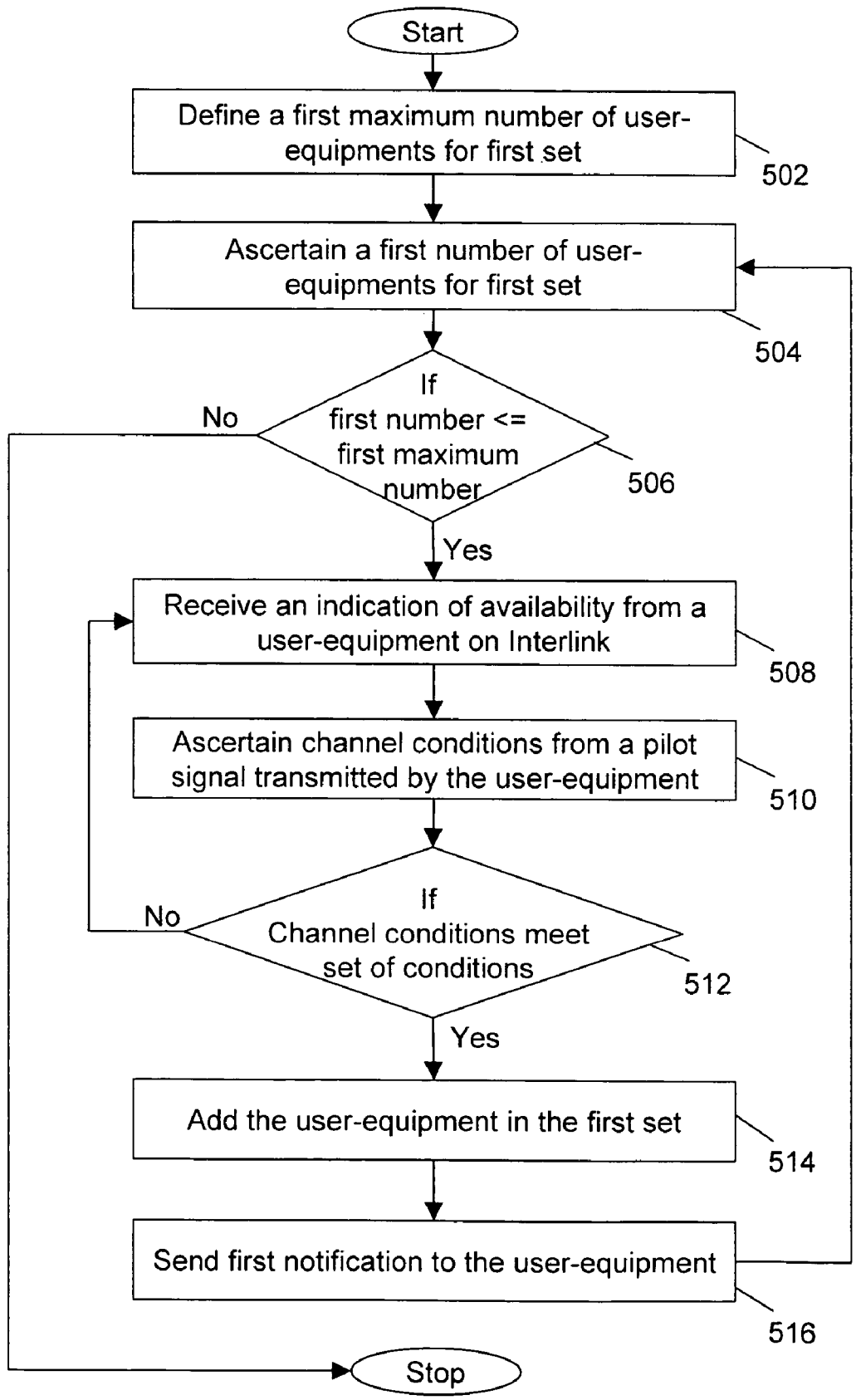
FIG. 5 is a flowchart depicting a method for the formation of a first set of user-equipments, in accordance with an embodiment of the invention.

FIG. 5 is a flowchart depicting a method for formation of first set 108, in accordance with an embodiment of the invention. In an embodiment, the formation of first set 108 is achieved under local control, i.e., one or more user-equipments 104 form first set 108. At step 502, the first maximum number is defined, which is based on a number of parameters. In an embodiment of the invention, a parameter that defines the first maximum number may be the capacity of Interlink 106. Another parameter that defines the first maximum number may be the capability of first user-equipment 104a. After defining the first maximum number, at step 504, a first number is ascertained. The first number defines the number of user-equipments 104 present in first set 108. At step 506, the first number is compared with the first maximum number. If the first number is less or equal to the first maximum number, first user-equipment 104a looks for indications of availability from other user-equipments 104, on Interlink 106. At step 508, an indication of availability is received from second user-equipment 104b, on Interlink 106. Second user-equipment 104b broadcasts an indication of availability on Interlink 106, if it can act as an antenna for other user-equipments 104. At step 510, the channel conditions between first user-equipment 104a and second user-equipment 104b are determined by using a pilot signal. This pilot signal is broadcast by second user-equipment 104b. In an embodiment of the invention, each user-equipment 104 periodically broadcasts a unique pilot signal. At step 512, the channel conditions are compared to a set of conditions. In an embodiment, a channel condition may be the strength of the channel. The set of conditions may include a threshold value for the strength of the channel. Therefore, if the channel strength is greater than the threshold value, the condition is met. If the condition is met, first user-equipment 104a adds second user-equipment 104b in first set 108, at step 514. At step 516, first user-equipment 104a sends a first notification to second user-equipment 104b. The first notification informs second user-equipment 104b that it has been added in first set 108. After sending the first notification to second user-equipment 104b, the first number is incremented by one. Thereafter, steps 504 to 516 are iteratively preformed till the condition at step 506 is true.

In an embodiment of the invention, first user-equipment 104a may not receive an indication of availability from any user-equipment 104 on Interlink 106. This may be because user-equipments 104 may not be present in the vicinity of first user-equipment 104a. Another reason may be that user-equipments 104 in the vicinity of first user-equipment 104a cannot serve as the antenna to any more of user-equipments 104. In such a scenario, first user-equipment 104a sends a request to a third user-equipment 104c, to act as an antenna for first user-equipment 104a. Third user-equipment 104c may accept the request. If third user-equipment 104c accepts the request, it sends an indication of availability on Interlink 106. This indication of availability is accepted by first user-equipment 104a. First user-equipment 104a determines the channel conditions between itself and third user-equipment 104c from a pilot signal that is broadcast periodically by third user-equipment 104c. These channel conditions are compared to a set of conditions. The set of conditions may include a threshold value for the strength of the channel. Therefore, if the channel strength is greater than the threshold value, the condition is met. If the condition is met, first user-equipment 104a adds third user-equipment 104c in first set 108. First user-equipment 104a sends a first notification to third user-equipment 104c to inform that it has been added in first set 108.

Similarly, second set 110 may also be formed. The second maximum number is defined for first user-equipment 104a. Thereafter, a second number is ascertained. The second number defines the number of user-equipments 104 present in second set 110. Then, the second number is compared with the second maximum number. If the second number is less than the second maximum number, first user-equipment 104a broadcasts an indication of availability. If a fifth user-equipment 104e receives the indication of availability and makes a decision to allow first user-equipment 104a to act as its antenna, it sends a first notification to first user-equipment 104a. Upon receiving the first notification, first user-equipment 104a adds fifth user-equipment 104e in second set 110. First user-equipment 104a stops sending an indication of its availability when the second number becomes equal to the second maximum number.

In an embodiment, first user-equipment 104a may receive a request from a sixth user-equipment 104f. In this case, first user-equipment 104a may choose to accept the request. Then, first user-equipment 104a may choose to remove a seventh user-equipment 104g from second set 110, which was earlier present in second set 110. This can be accomplished by sending a second notification to seventh user-equipment 104g. Second notification informs seventh user-equipment 104g that first user-equipment 104a will no longer operate as an antenna for it. Subsequently, first user-equipment 104a sends an indication of availability. Sixth user-equipment 104f receives this indication of availability and returns a first notification. Upon receiving this first notification, first user-equipment 104a adds sixth user-equipment 104g in second set 110.

In an embodiment of the invention, first user-equipment 104a may receive a second notification from a fourth user-equipment 104d, which is present in first set 108. The second notification is sent for removing fourth user-equipment 104d from first set 108. On receiving the second notification, first user-equipment 104a removes fourth user-equipment 104d from first set 108.

In an embodiment of the invention, the second notification may be sent due to various reasons by fourth user-equipment 104d. One reason could be the receipt of a request to act as an antenna for other user-equipments 104. Another reason could be based on a Set Quality Indicator (SQI), which is defined as the measure of the quality in terms of the improvement in capacity over a SISO system. This, in turn, will depend on the strength of the channels between first user-equipment 104a and first set 108, and on the number of user-equipments 104 in first set 108. Fourth user-equipment 104d may send a second notification to first user-equipment 104a only if first user-equipment 104a has more than two user-equipments 104 in first set 108; has a sufficiently high value of SQI; and makes a sufficiently low contribution to the SQI of fourth user-equipment 104d. To facilitate this, first user-equipment 104a periodically notifies fourth user-equipment 104d of the number of user-equipments 104 in first set 108 and the SQI of first user-equipment 104a. Yet another reason for sending the second notification could be the moving out of fourth user-equipment 104d from the vicinity of first user-equipment 104a. Still another reason could be the switching off of fourth user-equipment 104d.

In an embodiment of the invention, first user-equipment 104a continues to monitor the pilot signals from one or more of user-equipments 104 that are present in first set 108 and second set 110, so as to track the channel conditions. If the channel strength of a user-equipment 104 drops below a certain threshold, that user-equipment 104 may be removed.

In an embodiment of the invention, first user-equipment 104a and one or more user-equipments 104 together decide the configurations of first set 108 and second set 110. First user-equipment 104a redistributes first set 108 and second set 110, based on one or more conditions. In an embodiment, these conditions include the number and position of one or more of user-equipments 104 in the vicinity of first user-equipment 104a. In another embodiment, the one or more conditions include channel conditions, such as the strength of the channel between first user-equipment 104a, and user-equipments 104 in first set 108 and second set 110.

In an embodiment, first user-equipment 104a sends control information to first set 108. This information may include inter-user-equipment channel strengths. In another embodiment, first user-equipment 104a sends information about first set 108 to base stations 102. This helps base stations 102 to identify the maximum number of antennas from which it can transmit the data of first user-equipment 104a, and hence, the maximum number of streams in which the data of first user-equipment 104a can be split and processed. The information about first set 108 also helps base stations 102 to identify the minimum number of antennas with which it can receive the data of first user-equipment 104a.

For downlink communication, first set 108 accepts data on behalf of first user-equipment 104a. After the downlink data is received from base stations 102, user-equipments 104 in first set 108 transmit that data on Interlink 106.

Figure 6:
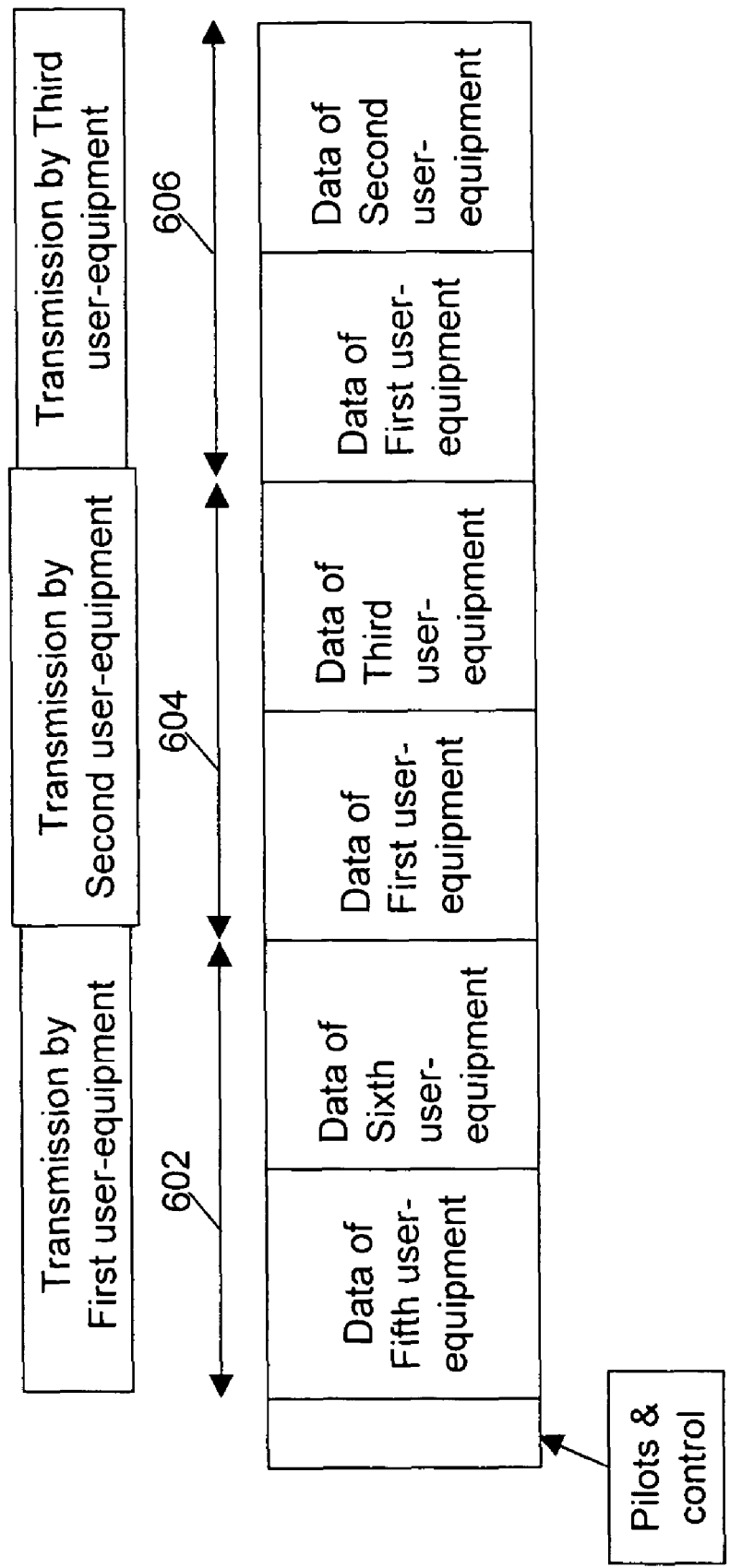
FIG. 6 illustrates the transmission of downlink data on the Interlink, in accordance with an embodiment of the invention.

FIG. 6 illustrates transmission of downlink data on Interlink 106, in accordance with an embodiment of the invention. In this embodiment, user-equipment 104 receives streams of the data of various user-equipments 104 in its second set 110, in different slots, from base station 102. It retransmits the data belonging to each user-equipment 104 in its second set 110, in a separate slot on Interlink 106. For example, first user-equipment 104a received the data of fifth user-equipment 104e and sixth user-equipment 104f from base stations 110. First user-equipment 104a transmits this data in a slot 602 that is defined for the communication of first user equipment 104a on Interlink 106. Similarly, second user-equipment 104b receives the data of first user-equipment 104a and third user-equipment 104c. Second user-equipment 104b transmits this data in slot 604 that is defined for communication of second user-equipment 104b on Interlink 106. In an embodiment, user-equipment 104 may encode the data with the code of that user-equipment 104 whose data was received. For example, first user-equipment 104a may encode the data of the fifth user-equipment 104e with a code of fifth user-equipment 104e. From the data transmitted on Interlink 106, each user-equipment 104 selects its data, which is stored along with the data received by its individual antennas, to obtain a composite data set. This composite data set can be decoded to extract the streams of data transmitted from the base station antennas. This process is similar to obtaining the data from all the antennas present on a single user-equipment 104.

FIG. 7 illustrates uplink communication of data by user-equipments 104 using TDMA, in accordance with an embodiment of the invention. In uplink communication, the data is split and processed into one or more streams based on the user-equipments in first set 108. The one or more streams are relayed to user-equipments 104 in first set 108 on Interlink 106. For example, first user-equipment 104a relays second stream and third stream to second user-equipment 104b and third user-equipment 104c, respectively. Thereafter, the streams of data of a user-equipment 104 are transmitted to base stations 102 in a time-slot that is assigned for communication of user-equipment 104. For example, first user-equipment 104a, second user-equipment 104b, and third user-equipment 104c transmit first stream, second stream and third stream of the data of first user-equipment 104a, respectively, to base stations 102 in the same time-slot. This is accomplished in the time-slot for uplink communication of data of first user-equipment 104a.

In an embodiment of the invention, each user-equipment 104 may have multiple antennas. The number of streams, in which the data is split and processed, is then equal to the total number of antennas of all user-equipments 104 in first set 108 and the antennas of first user-equipment 104a itself.

In various embodiments, different methods for power control may be used to further improve the capacity of the MIMO system. According to one such method, a Matrix Quality Indicator (MQI) may be defined as the measure of the capacity of first user-equipment 104a, to form first set 108. This, in turn, depends on the strength of the channels between first user-equipment 104a and user-equipments 104 within the vicinity of first user-equipment 104a. An MQI is communicated to base stations 102. Base stations 102 adjust the power transmitted to first user-equipment 104a, based upon its MQI. In other words, if its MQI is high, lesser power is transmitted to first user-equipment 104a and vice versa.

Embodiments of the invention exemplify the advantage of using one or more user-equipments, in the vicinity of a single user-equipment, as its antennas, thereby increasing the capacity of the wireless network. Moreover, as long as the user-equipments are spaced more than a few centimeters apart, the MIMO channels stay uncorrelated. Another advantage of the method disclosed in the various embodiments of the invention is that the method is useful even when the data of only one user-equipment is required to be communicated to the base stations. Moreover, the method makes it possible to use more antennas for communication than are available with the user-equipments in the vicinity of the single user-equipment, which are communicating during the period in which the said single user-equipment intends to communicate.

While the embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

Although the invention has been discussed with respect to specific embodiments thereof, these embodiments are merely illustrative, and not restrictive, of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention, described and illustrated herein, are possible in light of the teachings herein and are to be considered as part of the spirit and scope of the invention.

The foregoing description of illustrated embodiments of the invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. Distributed or networked systems, components and circuits can be used. Communication, or transfer, of data may be wired, wireless, or by any other means.

A "computer-readable medium" for purposes of embodiments of the invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Any suitable programming language can be used to implement the routines of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as Digital Signal Processing etc. The routines can operate in audio encoding environment or as stand-alone routines occupying all, or a substantial part, of the system processing.

What is claimed is:

1. A method for uplink communication of data from a plurality of user-equipments to one or more base stations in a MIMO wireless network, the data belonging to a first user-equipment, the data being split and processed into one or more streams, the method comprising the steps of:

transmitting a first stream of the one or more streams by the first user-equipment to the one or more base stations in a single slot, wherein the single slot is assigned for uplink communication of the data of the first user-equipment;

transmitting the remaining streams of the one or more streams to a first set of user-equipments by the first user-equipment on an Interlink, the first set of user-equipments comprising one or more of the plurality of user-equipments that operate as antennas for the first user-equipment, the Interlink being an arrangement for communication between the plurality of user-equipments;

receiving the remaining streams of the one or more streams by the first set of user-equipments on the Interlink;

transmitting the remaining streams of the one or more streams by the first set of user-equipments to the one or more base stations in the single slot; and forming the first set of user-equipments by the first user-equipment and one or more of the plurality of user-equipments, wherein the step of forming the first set of user-equipments comprises the steps of:

defining a first maximum number of user-equipments that can be present in the first set of user-equipments;

ascertaining a first number of user-equipments, the first number being the number of user-equipments in the first set of user-equipments; if the first number is less than the first maximum number, receiving an indication of availability on the Interlink, the indication of availability being broadcast by a second user-equipment that can operate as an antenna for the first user-equipment;

ascertaining channel conditions between the second user-equipment and the first user-equipment from a pilot signal received on the Interlink, the pilot signal being broadcast by the second user-equipment;

adding the second user-equipment to the first set of user-equipments if the channel conditions meet a set of conditions; and sending a first notification to the second user-equipment, the first notification notifying the second user-equipment that the second user-equipment has been added in the first set of user equipments.

2. The method according to claim 1, wherein the step of forming the first set of user-equipments further comprises the steps of: if the indication of availability is not received on the Interlink, sending a request to a third user-equipment to act as an antenna for the first user-equipment;

receiving an indication of availability from the third user-equipment;

ascertaining channel conditions between the third user-equipment and the first user-equipment from a pilot signal received on the Interlink, the pilot signal being broadcast by the third user-equipment;

adding the third user-equipment to the first set of user-equipments if the channel conditions meet a set of conditions; and sending the first notification to the third user-equipment.

3. A method for uplink communication of data from a plurality of user-equipments to one or more base stations in a MIMO wireless network, the data belonging to a first user-equipment, the data being split and processed into one or more streams, the method comprising the steps of:

transmitting a first stream of the one or more streams by the first user-equipment to the one or more base stations in a single slot, wherein the single slot is assigned for uplink communication of the data of the first user-equipment;

transmitting the remaining streams of the one or more streams to a first set of user-equipments by the first user-equipment on an Interlink, the first set of user-equipments comprising one or more of the plurality of user-equipments that operate as antennas for the first user-equipment, the Interlink being an arrangement for communication between the plurality of user-equipments;

receiving the remaining streams of the one or more streams by the first set of user-equipments on the Interlink;

transmitting the remaining streams of the one or more streams by the first set of user-equipments to the one or more base stations in the single slot; and forming a second set of user-equipments by the first user-equipment and one or more of the plurality of user-equipments, the second set of user-equipments comprising one or more of the plurality of user-equipments for which the first user-equipment operates as an antenna, wherein the step of forming the second set of user-equipments comprises the steps of:

defining a second maximum number of user-equipments that can be present in the second set of user-equipments;

ascertaining a second number of user-equipments, wherein the second number is the number of user-equipments in the second set of user-equipments; if the second number is less than the second maximum number;

sending an indication of availability on the Interlink, the indication of availability notifying that the first user-equipment can operate as an antenna;

receiving a first notification from a fifth user-equipment, the first notification notifying the first user-equipment to add the fifth user-equipment in the second set of user-equipments; and adding the fifth user-equipment in the second set of user-equipments.

4. The method according to claim 3, wherein the step of forming the second set of user-equipments further comprises the steps of: receiving a request from a sixth user-equipment to add the sixth user-equipment in the second set of user-equipments; if the second number is equal to the second maximum number, removing a seventh user-equipment from the second set of user-equipments;

sending an indication of availability to the sixth user-equipment;

receiving the first notification from the sixth user-equipment; and sending a second notification to the seventh user-equipment, the second notification notifying the seventh user-equipment that the seventh user-equipment has been removed from the second set of user-equipments.

5. A method for downlink communication of data from one or more base stations to a plurality of user-equipments in a MIMO wireless network, each base station comprising one or more antennas, the data belonging to a first user-equipment, the data being split and processed into one or more streams based on the one or more antennas, the method comprising the steps of:

transmitting the data from the one or more antennas of the one or more base stations in a single slot, the single slot being assigned for downlink communication of the data of the first user-equipment;

receiving the data by the first user-equipment in the single slot;

receiving the data by a first set of user-equipments in the slot, the first set of user-equipments comprising one or more of the plurality user-equipments that operate as antennas for the first user-equipment;

transmitting the data by the first set of user-equipments to the first user-equipment on an Interlink, the Interlink being a scheme for communication between the plurality of user-equipments;

receiving the data from the first set of user-equipments by the first user-equipment;

combining and decoding the data received from the one or more base stations and the data received from the first set of user-equipments by the first user-equipment; and forming the first set of user-equipments by the first user-equipment and one or more of the plurality of user-equipments, wherein the step of forming the first set of user-equipments comprises the steps of:

defining a first maximum number of user-equipments that can be present in the first set of user-equipments;

ascertaining a first number of user-equipments, the first number being the number of user-equipments in the first set of user-equipments; if the first number is less than the first maximum number;

receiving an indication of availability on the Interlink, the indication of availability being broadcast by a second user-equipment that can operate as an antenna for the first user-equipment;

ascertaining channel conditions between the second user-equipment and the first user-equipment from a pilot signal received on the Interlink, the pilot signal being broadcast by the second user-equipment;

adding the second user-equipment to the first set of user-equipments if the channel conditions meet a set of conditions; and sending a first notification to the second user-equipment, the first notification notifying the second user-equipment that the second user-equipment has been added in the first set of user-equipments.

6. The method according to claim 5, wherein the step of forming the first set of user-equipments further comprises the step of: if the indication of availability is not received on the Interlink, sending a request to a third user-equipment to act as an antenna for the first user-equipment;

receiving an indication of availability from the third user-equipment;

ascertaining channel conditions between the third user-equipment and the first user-equipment from a pilot signal received on the Interlink, the pilot signal being broadcast by the third user-equipment;

adding the third user-equipment to the first set of user-equipments if the channel conditions meet a set of conditions; and sending the first notification to the third user-equipment.

7. A method for downlink communication of data from one or more base stations to a plurality of user-equipments in a MIMO wireless network, each base station comprising one or more antennas, the data belonging to a first user-equipment, the data being split and processed into one or more streams based on the one or more antennas, the method comprising the steps of:

transmitting the data from the one or more antennas of the one or more base stations in a single slot, the single slot being assigned for downlink communication of the data of the first user-equipment;

receiving the data by the first user-equipment in the single slot;

receiving the data by a first set of user-equipments in the slot, the first set of user-equipments comprising one or more of the plurality user-equipments that operate as antennas for the first user-equipment;

transmitting the data by the first set of user-equipments to the first user-equipment on an Interlink, the Interlink being a scheme for communication between the plurality of user-equipments;

receiving the data from the first set of user-equipments by the first user-equipment;

combining and decoding the data received from the one or more base stations and the data received from the first set of user-equipments by the first user-equipment; and forming a second set of user-equipments by the first user-equipment and one or more of the plurality of user-equipments, the second set of user-equipments comprising one or more of the plurality of user-equipments for which the first user-equipment operates as an antenna, wherein the step of forming the second set of user-equipments comprises the steps of:

defining a second maximum number of user-equipments that can be present in the second set of user-equipments;

ascertaining a second number of user-equipments, wherein the second number is the number of user-equipments in the second set of user-equipments; if the second number is less than the second maximum number, sending an indication of availability on the Interlink, the indication of availability notifying that the first user-equipment can operate as an antenna;

receiving a first notification from a fifth user-equipment, the first notification notifying the first user-equipment to add the fifth user-equipment in the second set of user-equipments; and adding the fifth user-equipment in the second set of user-equipments.

8. The method according to claim 7, wherein the step of forming the second set of user-equipments further comprises the steps of: receiving a request from a sixth user-equipment to add the sixth user-equipment in the second set of user-equipments; if the second number is equal to the second maximum number, removing a seventh user-equipment from the second set of user-equipments;

sending an indication of availability to the sixth user-equipment;

receiving the first notification from the sixth user-equipment; and sending a second notification to the seventh user-equipment, the second notification notifying the seventh user-equipment that the seventh user-equipment has been removed from the second set of user-equipments.

9. A system for uplink communication in a MIMO wireless network, the system comprising:

a plurality of base stations for communicating data belonging to a single user equipment;

an Interlink, the Interlink facilitating the communication between the plurality of user-equipments; and a plurality of user-equipments, the plurality of user-equipments communicating data with each other and the base stations, wherein the system further comprises:

means for uplink communication of data from the plurality of user equipments to the base stations the data belonging to a first user-equipment, the data being split and processed into one or more streams;

means for transmitting a first stream of the one or more streams by the first user-equipment to the one or more base stations in a slot, wherein the slot is assigned for uplink communication of the data of the first user-equipment;

means for transmitting the remaining streams of the one or more streams to the first set of user-equipments by the first user-equipment on an Interlink, the first set of user-equipments comprising one or more of the plurality of user-equipments that operate as antennas for the first user-equipment, the Interlink being a scheme for communication between the plurality of user-equipments;

means for receiving the remaining streams of the one or more streams by the first set of user-equipments on the Interlink;

means for transmitting the remaining streams of the one or more streams by the first set of user-equipments to the one or more base stations in the slot; and means for forming the first set of user-equipments, wherein means for forming the first set of user-equipments comprises:

means for defining a first maximum number of user-equipments that can be present in the first set of user-equipments;

means for ascertaining a first number of user-equipments, the first number being the number of user-equipments in the first set of user-equipments;

means for receiving an indication of availability on the Interlink, the indication of availability being broadcast by a second user-equipment that can operate as an antenna for the first user-equipment;

means for ascertaining channel conditions between the second user-equipment and the first user-equipment from a pilot signal received on the Interlink, the pilot signal being broadcast by the second user-equipment;

means for adding the second user-equipment to the first set of user-equipments if the channel conditions meet a set of conditions; and means for sending a first notification to the second user-equipment, the first notification notifying the second user-equipment that the second user-equipment has been added in the first set of user-equipments.

10. A system for uplink communication in a MIMO wireless network, the system comprising:

a plurality of base stations for communicating data belonging to a single user equipment;

an Interlink, the Interlink facilitating the communication between the plurality of user-equipments; and a plurality of user-equipments, the plurality of user-equipments communicating data with each other and the base stations, wherein the system further comprises:

means for uplink communication of data from the plurality of user equipments to the base stations the data belonging to a first user-equipment, the data being split and processed into one or more streams;

means for transmitting a first stream of the one or more streams by the first user-equipment to the one or more base stations in a slot, wherein the slot is assigned for uplink communication of the data of the first user-equipment;

means for transmitting the remaining streams of the one or more streams to the first set of user-equipments by the first user-equipment on an Interlink, the first set of user-equipments comprising one or more of the plurality of user-equipments that operate as antennas for the first user-equipment, the Interlink being a scheme for communication between the plurality of user-equipments;

means for receiving the remaining streams of the one or more streams by the first set of user-equipments on the Interlink;

means for transmitting the remaining streams of the one or more streams by the first set of user-equipments to the one or more base stations in the slot; and means for forming a second set of user-equipments, the second set of user-equipments comprising one or more of the plurality of user-equipments for which the first user-equipment operates as an antenna, wherein the means for forming the second set of user-equipments comprises:

means for defining a second maximum number of user-equipments that can be present in the second set of user-equipments;

means for ascertaining a second number of user-equipments, wherein the second number is the number of user-equipments in the second set of user-equipments;

means for sending an indication of availability on the Interlink, the indication of availability notifying that the first user-equipment can operate as an antenna;

means for receiving a first notification from a fifth user-equipment, the first notification notifying the first user-equipment to add the fifth user-equipment in the second set of user-equipments; and means for adding the fifth user-equipment in the second set of user-equipments.

11. A system for downlink communication in a MIMO wireless network, the system comprising:

a plurality of base stations for communicating data belonging to a single user equipment;

an Interlink, the Interlink facilitating the communication between the plurality of user-equipments;

a plurality of user-equipments, the plurality of user-equipments communicating data with each other and the plurality of base stations; wherein the system further communicating data from the plurality of base stations to the plurality of user-equipments in a wireless network, each base station comprising one or more antennas, the data belonging to a first user-equipment, the data being split and processed into one or more streams based on the one or more antennas, the system comprising:

means for transmitting the data from the one or more antennas of the one or more base stations in a slot, the slot being assigned for downlink communication of the data of the first user-equipment;

means for receiving the data by the first user-equipment in the slot;

means for receiving the data by a first set of user-equipments in the slot, the first set of user-equipments comprising one or more of the plurality user-equipments that operate as antennas for the first user-equipment;

means for transmitting the data by the first set of user-equipments to the first user-equipment on an Interlink, the Interlink being a scheme for communication between the plurality of user-equipments;

means for receiving the data from the first set of user-equipments by the first user-equipment;

means for combining and decoding the data received from the one or more base stations and the data received from the first set of user-equipments by the first user-equipment; and means for forming the first set of user-equipments, wherein the means for forming the first set of user-equipments comprises:

means for defining a first maximum number of user-equipments that can be present in the first set of user-equipments;

means for ascertaining a first number of user-equipments, the first number being the number of user-equipments in the first set of user-equipments;

means for receiving an indication of availability on the Interlink, the indication of availability being broadcast by a second user-equipment that can operate as an antenna for the first user-equipment;

means for ascertaining channel conditions between the second user-equipment and the first user-equipment from a pilot signal received on the Interlink, the pilot signal being broadcast by the second user-equipment;

means for adding the second user-equipment to the first set of user-equipments if the channel conditions meet a set of conditions; and means for sending a first notification to the second user-equipment, the first notification notifying the second user-equipment that the second user-equipment has been added in the first set of user-equipments.

12. A system for downlink communication in a MIMO wireless network, the system comprising:

a plurality of base stations for communicating data belonging to a single user equipment;

an Interlink, the Interlink facilitating the communication between the plurality of user-equipments;

a plurality of user-equipments, the plurality of user-equipments communicating data with each other and the plurality of base stations; wherein the system further communicating data from the plurality of base stations to the plurality of user-equipments in a wireless network, each base station comprising one or more antennas, the data belonging to a first user-equipment, the data being split and processed into one or more streams based on the one or more antennas, the system comprising:

means for transmitting the data from the one or more antennas of the one or more base stations in a slot, the slot being assigned for downlink communication of the data of the first user-equipment;

means for receiving the data by the first user-equipment in the slot;

means for receiving the data by a first set of user-equipments in the slot, the first set of user-equipments comprising one or more of the plurality user-equipments that operate as antennas for the first user-equipment;

means for transmitting the data by the first set of user-equipments to the first user-equipment on an Interlink, the Interlink being a scheme for communication between the plurality of user-equipments;

means for receiving the data from the first set of user-equipments by the first user-equipment;

means for combining and decoding the data received from the one or more base stations and the data received from the first set of user-equipments by the first user-equipment; and means for forming a second set of user-equipments, the second set of user-equipments comprising one or more of the plurality of user-equipments for which the first user-equipment operates as an Antenna, wherein the means for forming the second set of user-equipments comprises:

means for defining a second maximum number of user-equipments that can be present in the second set of user-equipments;
means for ascertaining a second number of user-equipments, wherein the second number is the number of user-equipments in the second set of user-equipments;
means for sending an indication of availability on the Inter-link, the indication of availability notifying that the first user-equipment can operate as an antenna;
means for receiving a first notification from a fifth user-equipment, the first notification notifying the first user-equipment to add the fifth user-equipment in the second set of user-equipments; and
means for adding the fifth user-equipment in the second set of user-equipments.

* * * * *